Figure 1:
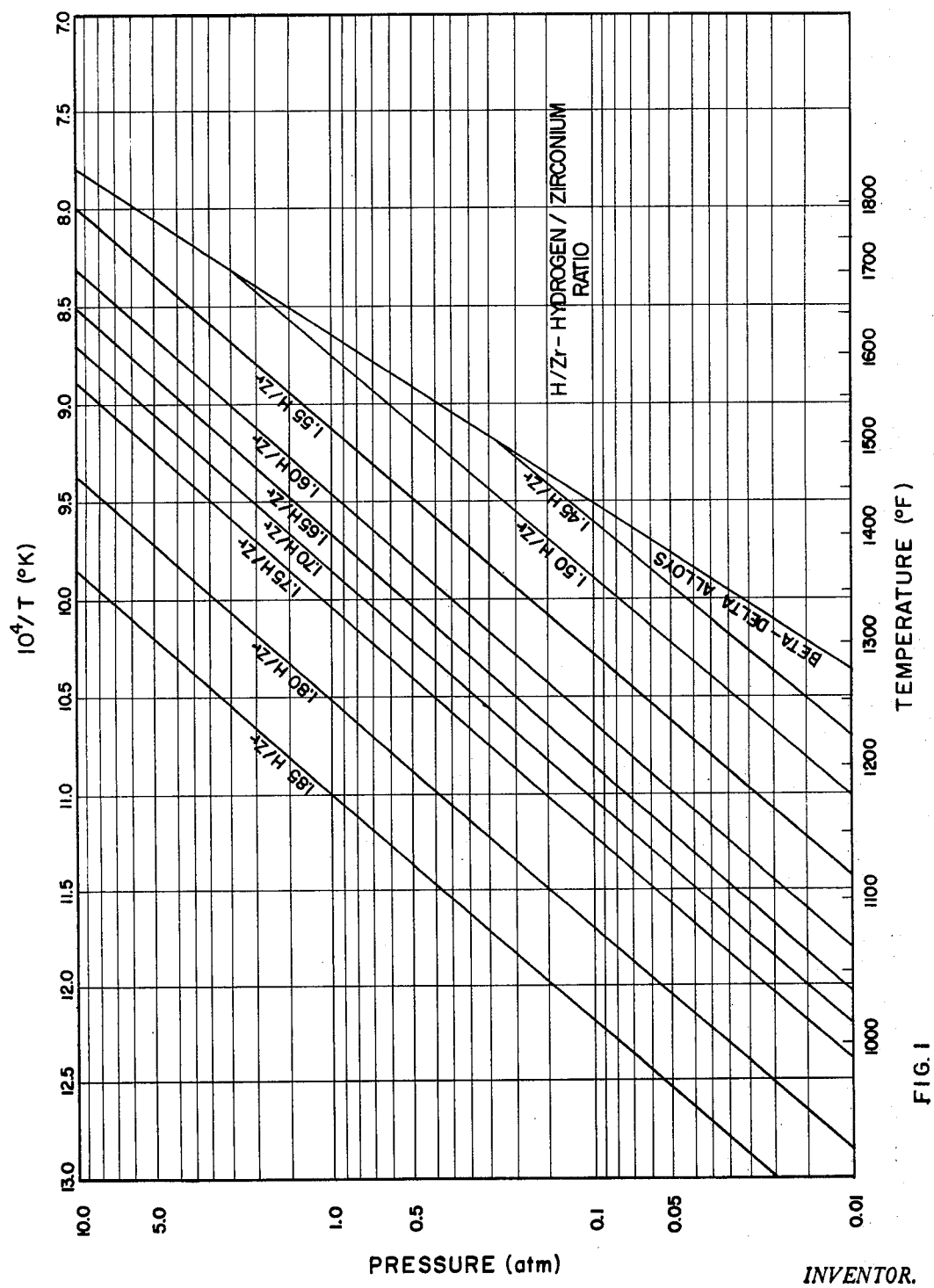

United States Patent [19]

Katz

[11] 3,776,508

[45] Dec. 4, 1973

[54] PROCESS FOR MASSIVELY HYDRIDING ZIRCONIUM-URANIUM FUEL ELEMENTS

[75] Inventor: Norman H. Katz, Northridge, Calif.

[73] Assignee: The United States of America as represented by the United States Atomic Energy Commission, Washington, D.C.

[22] Filed: May 26, 1961

[21] Appl. No.: 113,036

[52] U.S. Cl............ 252/301.1 R, 176/92, 423/255, 423/645
[51] Int. Cl............................................. C01b 6/00
[58] Field of Search................ 204/193.2, 34, 154.2; 23/204, 14.5; 252/301.1 R; 176/92; 423/255, 645

[56] References Cited
UNITED STATES PATENTS

| 3,018,169 | 1/1962 | Veterans | 204/DIG. 4 |
| 3,070,526 | 1/1962 | Merten | 204/DIG. 4 |
| 3,019,176 | 1/1962 | McReynolds et al. | 204/DIG. 4 |
| 2,929,707 | 3/1960 | Weeks et al. | 204/DIG. 4 |

FOREIGN PATENTS OR APPLICATIONS

| 604,866 | 9/1960 | Canada | 204/DIG. 4 |

OTHER PUBLICATIONS

2nd UN Conference on Peaceful Use of Atomic Energy at Geneva, Sept. 1958, Vol. 6, pp. 111–115.
Reactor Core Materials Vol. 3, No. 2, May 1960, p. 16.

*Primary Examiner*—Carl D. Quarforth
*Assistant Examiner*—F. M. Gittes
*Attorney*—William R. Lane and Gerald A. Koris

[57] ABSTRACT

A method of hydriding uranium-zirconium alloy by heating the alloy in a vacuum, introducing hydrogen and maintaining an elevated temperature until occurrence of the beta-delta phase transformation and isobarically cooling the composition.

6 Claims, 2 Drawing Figures

PROCESS FOR MASSIVELY HYDRIDING ZIRCONIUM-URANIUM FUEL ELEMENTS

My invention relates to a process for massively hydriding a uranium-zirconium alloy fuel element, and more particularly to a process of hydriding such an alloy to a very high hydrogen density.

Zirconium hydride is an excellent moderating material for a nuclear reactor core, particularly where cores of small diameter or high power density are required. Hydrogen has the greatest neutron slowing down ability of any element, and combined with zirconium, a structural metal of relatively low thermal neutron absorption cross section, the hydrogen is in a relatively stable, high density form adapted for high temperature utilization. Zirconium hydride may be used as a moderator material in both heterogeneous and in homogeneous nuclear reactor cores. In the heterogeneous core, the fuel and moderator are separated, and in the homogeneous core, a uranium-zirconium alloy hydride composition is typically employed. The homogeneous composition has many nuclear, fabrication, and heat transfer advantages, and has been employed to date in a number of reactor systems. For information on zirconium hydride and its use in reactors, reference is made to the following representative publications: "Nucleonics," January 1960, page 104; U.S. Pat. No. 2,929,707; and U. S. Pat. No. 2,940,916 and the abandoned U.S. Pat. application Ser. No. 664,706 cited therein.

The hydrogen absorption of a uranium-zirconium alloy does not follow a fixed stoichiometry but varies with the hydriding method employed. Since the moderating properties of the composition are dependent upon the hydrogen, it follows that the core size is directly proportional to the hydrogen concentration of the uranium-zirconium alloy. The hydrogen content of the uranium-zirconium hydride is normally expressed by the term $N_H$, which represents the number of hydrogen atoms per cubic centimeter of uranium-zirconium. For example, $N_H = 5.0$ indicates that there are $5.0 \times 10^{22}$ atoms hydrogen/cc uranium-zirconium alloy.

Present methods for the fabrication of uranium-zirconium alloy hydride generally involve the formation of a uranium-zirconium alloy (1–50 weight percent uranium), followed by the massive hydriding of the alloy at an elevated temperature and pressure in a hydrogen atmosphere. After equilibration is reached at a given $N_H$, hydrogen flow is stopped, the heat turned off, and the hydrided bodies allowed to furnace cool to room temperatures. Such prior art processes have not been able to obtain $N_H$'s greater than about 4.5, and have had to use high pressures and temperatures over extended periods of time. Further, while such methods are basically sound, nonetheless a high proportion of the fuel members display severe cracks, exudations, and warpage. To achieve relatively high $N_H$'s using such methods, it would be necessary to massively hydride at very high pressures, for example at about 1,000 psig. This would necessitate the construction of double-walled furnaces, capable of sustaining high pressures at temperatures up to 1,800° F, and would require provision of many safety features.

In view of the shortcomings of the prior art, an object of my invention is to provide an improved method of hydriding a uranium-zirconium alloy.

Another object is to provide a method for massively hydriding uranium-zirconium alloy to higher $N_H$'s than have heretofore been possible.

Still another object is to provide such a method of obtaining high, closely-controlled $N_H$'s at relatively low pressures and temperatures.

Still another object is to provide such an improved hydriding method which is relatively simple and consistently produces metallurgically sound, uranium-zirconium alloy hydride bodies of a high, predetermined $N_H$.

Further objects and advantages of my invention will become apparent from the following detailed description.

Figure 2:
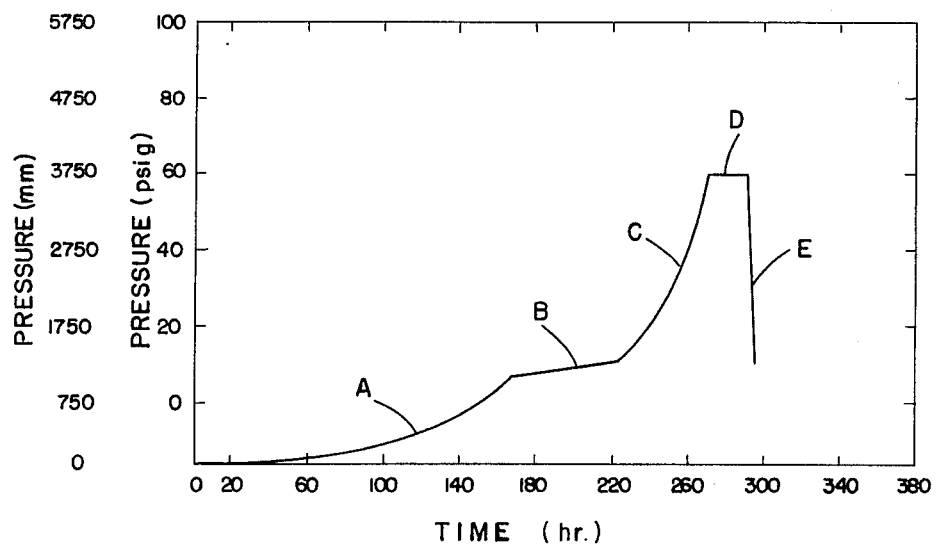

In the drawings, FIG. 1 is a graph showing various H/Zr isochores (constant compositions over varying temperatures and pressures), and FIG. 2 is a graph of pressure relationships during a hydriding run.

In accordance with my present invention, a uranium-zirconium alloy may be hydrided by heating the alloy in a hydrogen atmosphere at elevated pressures, and then cooling the hydrided material along an isobar (constant pressure) until the desired $N_H$ is obtained. Isobaric cooling is relatively simple, and uniformly hydrided material with extremely high hydrogen concentrations (e.g., $N_H = 6.5$) is regularly obtained. The temperatures and pressures employed are relatively low, and the hydrided bodies are metallurgically sound, displaying none of the cracks or warpage associated with other methods.

After equilibration is reached at a given pressure and temperature in the hydrogenating step, isobaric cooling is initiated, which comprises gradually decreasing temperature while maintaining pressure constant. The hydrogen concentration of the final product can be closely controlled in this manner, as reference to FIG. 1 will illustrate. It is seen that decreasing temperature while maintaining pressure constant results in moving from an isochore of a lower H/Zr ratio to an isochore of a higher H/Zr ratio. For example, the isochore at 1,650° F and 2 atmospheres pressure is about 1.52 H/Zr, and isobarically cooling to 1,350° F reaches an isochore of about 1.77 H/Zr. The absorbed hydrogen is principally in the form of zirconium hydride. Thus, isobaric cooling to a specific temperature not only yields a high $N_H$, but the near desired composition. At such a point isobaric cooling is discontinued, and the body is permitted to reach the ambient temperature by furnace cooling. The $N_H$ reached during isobaric cooling is maintained during furnace cooling.

The steps of my hydriding process will now be considered in more detail. Uranium-zirconium alloys may satisfactorily range in uranium composition from about 1–50 weight percent uranium, depending upon the enrichment of the uranium with respect to U–235 and the requirements of the particular reactor application. In most cases the uranium content of the alloy ranges between about 5–20 weight percent, and a particularly satisfactory and frequently used alloy consists of about 10 weight percent uranium enriched to about 90 percent in U–235. The uranium-zirconium alloy may be made by a number of conventional methods, including induction casting and consumable arc melting. The uranium-zirconium alloy fuel members, in the desired physical form for later use as fuel elements, such as rods or plates, are first cleaned, placed in a ceramic boat, and the assembly put into a retort. The system is pressurized and flushed with helium or other inert gas and tested for leak tightness. This system is then evacuated to about a pressure of 5 microns or less, and the hydriding procedure instituted.

The first step in the process comprises slowly heating the fuel members to a temperature of about 1,600°–1,700° F at a rate of up to about 300° F per hour. This is to remove any gases occluded in the fuel bodies, and also to prepare the bodies for hydrogen treatment; hydrogen diffusion is better at elevated temperatures and a more homogeneous hydrogen distribution in the alloy is thereby obtained. While the alloy may be heated to a temperature below about 1,600° F, the diffusion rate is correspondingly slower, and at temperatures in excess of about 1,700° F the fuel material may be weakened and small cracks introduced which are enlarged upon hydriding. Similarly, the rate of temperature increase may be satisfactorily considerably less than 300° F per hour, but this lengthens the process time, and rates greater than about 300° F per hour may cause thermal shocking and cracking. It is preferred to heat the fuel members to about 1,650° F at a rate of about 200° F per hour.

The following steps in the process are best followed by referring to FIG. 2 of the drawings. Hydrogen is slowly introduced into the reaction chamber and the pressure allowed to build up, as is indicated in the portion of the curve in FIG. 2 identified by A. The alloy at this point is still in the beta phase. As indicated on FIG. 1, the beta-delta phase transformation occurs at 6.20 psig at about 1,650° F, at region B of the graph in FIG. 2.

The phase change is accompanied by a large volume increase and, if such volume increase is too rapid, cracking of the body could result; the rate of hydrogen introduction is accordingly adjusted to prevent such an occurrence. Since the phase change occurs at a pressure of about 6.20 psig, any pressure greater than this is satisfactory. It is generally preferred to allow the pressure in the chamber to build up to about 15 psig through hydrogen introduction, thereby providing sufficient margin for the phase change to occur. With the pressure setting at 15 psig maximum, a hydrogen flow rate of about 0.26 grams $H_2$ per hour or 0.075 mgm $H_2$/gm Zr/hr occurs. The rate of hydrogen introduction may vary about this figure while still avoiding any cracking problems. With significantly lower hydrogen flow rates, however, correspondingly longer times are required and, with flow rates significantly greater than the indicated, too rapid volume change may occur. Generally, a hydrogen flow rate of about 0.050–0.100 mgm $H_2$/gm Zr/hr is satisfactory, while the 0.075 mgm $H_2$/gm Zr/hr rate is preferred. The phase change is complete when the pressure extends beyond 6.20 psig, at which pressure the phase change occurs; when it reaches about 14 psig (the end of portion B) it can be considered that the phase change is complete.

With completion of the phase change, the resulting delta-phase, uranium-zirconium alloy is partially hydrogenated. Additional gas entering the system now goes to sharply increase the pressure in the system, rather than into the change of phase reaction, which occurs without a significant pressure increase. The system regulator is therefore reset to about 65 psig maximum when the phase change is complete. The hydrogen flow rate in the system remains the same as above (0.075 mgm $H_2$/gm Zr/hr), but the system pressure goes up markedly, as seen in region C in FIG. 2.

The pressure build up at the given temperature allows hydrogenation to continue until a desired composition isochore (H/Zr ratio) is obtained, as seen in FIG. 1. For example, assuming that the 1.58 H/Zr isochore is to be reached at a temperature of 1,650° F, the system pressure is permitted to build up to about 60 psig. When the pre-selected pressure is reached, the flow of hydrogen is stopped and the pressure allowed to stabilize at this point for several hours (e.g., 2 hours) to allow equilibration and the formation of a homogeneous composition to occur. It is not necessary to go to higher pressures in order to obtain final compositions with a high H/Zr ratio since, as FIG. 1 indicates, the isobaric cooling will shift the composition to such a higher H/Zr ratio.

After equilibrium is established, as above at 60 psig and 1,650° F, isobaric cooling can commence. Hydrogen flow is again started, but at a significantly higher rate than above, since hydrogen is absorped at a faster rate on cooling within the pressure and temperature ranges indicated in FIG. 1. That this phenomenon occurs is also apparent from the isochores in FIG. 1. Thus, the hydrogen flow rate required to maintain constant pressure during cooling (region D in FIG. 2) is a factor of about 1½ – 3 greater than in the earlier outlined steps, and is generally a factor of about 2 greater, or in other terms is about 0.1 – 0.3 mgm $H_2$/gm Zr/hr. For example, when the initial flow rate is 0.075 mgm $H_2$/gm Zr/hr, as above, the hydrogen flow necessary to maintain the 60 psig during cooling is about 0.13 mgm $H_2$/gm Zr/hr. Since the particular flow rate is that required to maintain a given constant pressure during cooling, the actual value may be experimentally determined in any given case and will depend upon the previously employed temperatures and pressures.

The rate at which temperatures may satisfactorily drop is about 10°–50° F per hour. While the cooling rate may be operably less than about 10° F per hour, it is impractically slow, and if the rate is greater than about 50° F per hour, thermal shock may take place. The optimum cooling rate is about 20° F per hour. When the desired isochore is reached, for instance 1.85 H/Zr at 1,320° F, the flow of hydrogen is stopped and equilibrium again established at a given pressure (e.g., 60 psig for 2 hours).

At this point isobaric cooling ceases, and the pressure is permitted to fall as hydrogen is absorbed by the hydride composition upon further cooling. To prevent cracking of the hydrided bodies, however, cooling through the first several hundred degrees, for example down to about 1,000° F, is controlled. While the cooling rate is satisfactorily varied over a range up to about 60° F per hour, a rate of about 50° F per hour is found to be about optimum. When the lower temperature is reached (e.g.,1,000° F), the power is turned off and the alloy allowed to furnace cool. With the end of isobaric cooling, the pressure in the system drops considerably over a relatively few hours, as seen in region E in FIG. 2. The composition isochore reached during isobaric cooling is kept during the furnace cooling. Prior to removal of the fuel members, the retort is flushed with an inert gas, and about 700 mm pressure allowed to remain to prevent spewing of particles to the atmosphere.

The following example is offered to illustrate my invention in greater detail.

EXAMPLE

Two rods of an alloy consisting essentially of 93 wt. percent zirconium-7 wt. percent uranium, having dimensions 1.00 inch diameter by 10 inches long, were hydrided according to the following procedure. The total hydriding time was 246 hours, and the pressure versus hydriding time relationships in the retort are shown in FIG. 2.

Prior to hydriding the rods were ground to a 10 micro finish, weighed, cleaned with acetone, wrapped with tungsten wire, and placed in a high temperature ceramic boat. The complete assembly was then put into the retort, and the system evacuated at room temperature to a pressure of less than 1 micron Hg. The retort was pressurized to 50 psig with helium and tested for leaks. The system was again evacuated to 25 microns, then pressurized to 50 psig with helium; this was followed by evacuation to about 5 microns. The helium was further removed by flushing twice with hydrogen. The system was finally evacuated to about 5 microns. The rods were heated to 1,650° F, at a rate of 200° F/hr. When the temperature reached 1,650° F, hydrogen was allowed to flow through the palladium thimble, preheated to 660° F, into one end of the retort.

The regulator was set at 15 psig and the flowmeter adjusted to 4.0 (using a sapphire ball as indicator). This produced a flow rate of 0.26 gm $H_2$/hr or 0.075 mgm $H_2$/gm Zr/hr. This rate prevailed through the beta-delta phase change at 1,080 mm (6.20 psig) at 1,650° F, and continued until the pressure in the system reached 14 psig.

The regulator was then reset to 65 psig and the flowmeter readjusted to 2.0. This allowed the flow rate to remain at 0.075 mgm $H_2$/gm Zr/hr. The temperature was maintained at 1,650° F. Upon reaching 60 psig in the retort, the flow of hydrogen was stopped and the pressure allowed to stabilize at 60 ± 1 psig for 2 hours. After equilibrium was established at 60 psig and 1,650° F, hydrogen flow was again adjusted to a new rate of 0.13 mgm $H_2$/gm Zr/hr, obtained by setting the regulator at 65 psig and the flowmeter at 4.0.

Isobaric cooling was commenced at 60 psig, at a rate of 20° F/hr, to 1,320° F. The flow of hydrogen was stopped and equilibrium was established at 1,320° F and 60 ± 1 psig for 2 hours. The rods were cooled to 1,000° F, at a rate of 50° F/hr. At 1,000° F, the power was turned off and the rods allowed to furnace cool. Prior to removal of the rods, the retort was flushed twice with helium. About 700 mm of helium was allowed to remain in the retort to prevent spewing of particles to the atmosphere. The rods were removed from the retort, photographed, visually examined, weighed, and sectioned for analysis and metallographic examination. The density was determined by a water displacement technique.

The rods were homogeneous in composition, showed no cracking, and were otherwise metallurgically sound. The results of the run are tabulated below.

TABLE I

| Rod Number | Weight (gm.) | | | Hydrogen (average)[1] | | |
|---|---|---|---|---|---|---|
| | Before hydriding | After hydriding | Gain | Wt. percent | gm./cc. | NH |
| 43R3 | 2,073.886 | 2,112.815 | 38.929 | 1.84 | 6.06 | 6.66 |
| 43R4 | 2,059.404 | 2,097.707 | 38.366 | 1.83 | 6.06 | 6.62 |

[1] Based on weight gain of hydrogen.

TABLE II

| Rod number | Before hydriding | | | After hydriding | | | Volume change, percent |
|---|---|---|---|---|---|---|---|
| | Diameter (in.) | Length (in.) | Volume (in.³) | Diameter (in.) | Length (in.) | Volume (in.³) | |
| 43R3 | 1.351 | 12.664 | 17.590 | 1.448 | 13.070 | 20.660 | 17.470 |
| 43R4 | 1.344 | 12.690 | 18.000 | 1.436 | 13.100 | 21.230 | 17.950 |

The following table indicates the time required for each phase of a somewhat faster hydriding cycle, and is intended as another example of my invention to indicate the flexible range in adjusting the hydrogen flow rate. The temperatures employed are as in the above Example.

TABLE III

| H/Zr | H Required (gm) | Flow Rate (mgm $H_2$/gm Zr/hr) | Time Required (hr) |
|---|---|---|---|
| 0–1.15 | 45.75 | 0.140 | 90 |
| 1.15–1.50 (phase change) | 13.92 | 0.075 | 52 |
| 1.50–1.57 | 2.76 | 0.120 | 7 |
| 1.57–1.83 | 10.32 | 0.180 | 16 |
| 1.83–1.85 | 0.8 gm H obtained from residual gas in retort during cooling | | Total 165 |

The foregoing examples are intended to be merely illustrative of my invention. Therefore, my invention should be understood to be limited only as is indicated in the appended claims.

I claim:

1. A method of massively hydriding uranium-zirconium alloy, which comprises placing said alloy in a furnace, evacuating said furnace to vacuum, heating the alloy to a temperature of about 1,600°–1,700° F at a maximum rate of about 300° F per hour, then introducing hydrogen into said furnace at a flow rate of about 0.050–0.100 mgm $H_2$/gm Zr/hr while maintaining said temperature until beta-delta phase transformation has occured and a pre-selected H/Zr alloy composition ratio obtained, then isobarically cooling said composition at a rate of about 10°–50° F per hour, while maintaining the constant pressure with a hydrogen flow rate of about 0.10–0.30 mgm $H_2$/gm Zr/hr, until an isochore of the final desired composition is obtained, and then permitting said composition to furnace cool to ambient conditions.

2. A method of massively hydriding uranium-zirconium alloy, which comprises placing said alloy in a chamber, drawing a vacuum on said chamber, heating said alloy to a temperature of about 1,600°–1,700° F. at a maximum rate of about 300° F. per hour, introducing hydrogen into said chamber at a flow rate of about 0.050–0.100 mgm. H₂/gm. Zr/hr. while maintaining said temperature, until beta-delta phase transformation has occurred and the pressure in said system through hydrogen introduction has increased to a maximum of about 65 p.s.i.g., then isobarically cooling the resulting hydrided composition at a rate of about 10°–50° F. per hour, the pressure being maintained constant by introducing hydrogen into said chamber at a flow rate of about 0.10–0.30 mgm. H₂/gm. Zr/hr., until an isochore of final desired composition is obtained, and then cooling said alloy to ambient conditions in said chamber without further hydrogen introduction.

3. A method of massively hydriding uranium-zirconium alloy which comprises placing said alloy in a chamber, evacuating said chamber to vacuum, slowly heating said alloy to a temperature of about 1,600°–1,700° F., slowly introducing hydrogen into said chamber while maintaining said temperature to increase the pressure therein to between ambient and a maximum of about 15 p.s.i.g., until the beta to delta phase transformation is completed, then further increasing the pressure in said chamber through hydrogen introduction until a first selected H/Zr ratio is obtained, slowly isobarically cooling the resulting hydrided body, the pressure being maintained uniform in said chamber during such cooling by hydrogen introduction, until a final preselected H/Zr ratio is obtained, and then slowly cooling said composition to ambient conditions without further hydrogen introduction.

4. A method for massively hydriding uranium-zirconium alloy, which comprises placing said alloy in a furnace, drawing a vacuum on said furnace, heating said alloy to a temperature of about 1,600°–1,700° F at a rate of about 200° F per hour, introducing hydrogen into said chamber at a rate of about 0.075 mgm H₂/gm Zr/hr, until a pressure of about 60 psig is reached at a temperature of about 1,650° F, then isobarically cooling the resulting hydrided composition at a rate of about 20° F per hour while maintaining constant pressure by introducing hydrogen into said chamber at a rate of about 0.13 mgm H₂/gm Zr/hr, until a temperature of about 1,300° F is reached, cooling the resulting hydrided alloy to a temperature of about 1,000° F at a rate of about 50° F per hour without further introduction of hydrogen, and then cooling said alloy to ambient conditions in said furnace without further temperature or pressure regulation.

5. A method of massively hydriding uranium-zirconium alloy, which comprises placing said alloy in a chamber, evacuating said chamber to vacuum, heating the alloy at a maximum rate of about 300° F. per hour to a temperature of about 1,600°–1,700° F., introducing hydrogen into said chamber at a flow rate of about 0.050–0.100 mgm. H₂/gm. Zr/hr. while maintaining said temperature to increase the pressure therein to between ambient and a maximum of about 15 p.s.i.g., until the beta-delta phase change is completed, then further increasing the pressure in said chamber with hydrogen at said flow rate while maintaining said temperature, until a first selected H/Zr ratio is obtained, isobarically cooling the resulting hydrided body at a rate of about 10°–50° F. per hour, the pressure in said chamber being maintained constant with hydrogen introduced at a rate of about 0.100–0.300 mgm. H₂/gm. Zr/hr., until an isochore of the final desired composition is obtained, and then slowly cooling said composition to ambient conditions in said chamber without further hydrogen introduction.

6. A method of massively hydriding uranium-zirconium alloy, which comprises placing said alloy in a chamber, evacuating said chamber to vacuum, heating the alloy to a temperature of about 1,600°–1,700° F. at a rate of about 200° F. per hour, introducing hydrogen into said chamber at a flow rate of about 0.050–0.100 mgm. H₂/gm. Zr/hr., while maintaining said temperature, increasing the pressure in said chamber to between atmospheric and about 15 p.s.i.g., until the beta-delta phase transformation is complete, then increasing the pressure in said chamber through hydrogen introduction at the aforesaid flow rate until a pressure of about 60 p.s.i.g. is reached, then isobarically cooling the resulting hydrided composition at a rate of about 10°–50° F. per hour, the pressure being maintained constant with hydrogen introduced at a flow rate of about 0.100–0.300 mgm. H₂/gm. Zr/hr., until a temperature of about 1,300° F. is reached, and then slowly cooling said composition to ambient conditions in said chamber without further hydrogen introduction.

* * * * *